US009409253B2

(12) United States Patent
Matlack et al.

(10) Patent No.: US 9,409,253 B2
(45) Date of Patent: *Aug. 9, 2016

(54) FRICTION STIR WELD PLUGS AND METHODS OF USING THEREOF

(71) Applicant: The Boeing Company, Chicago, IL (US)

(72) Inventors: Mike P. Matlack, St. Louis, MO (US); Amy M. Helvey, St. Louis, MO (US); Randy A. Card, St. Louis, MO (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/005,350

(22) Filed: Jan. 25, 2016

(65) Prior Publication Data

US 2016/0136754 A1 May 19, 2016

Related U.S. Application Data

(62) Division of application No. 14/700,384, filed on Apr. 30, 2015, now Pat. No. 9,272,362, which is a division of application No. 14/043,596, filed on Oct. 1, 2013, now Pat. No. 9,056,370.

(51) Int. Cl.
*B23K 20/12* (2006.01)

(52) U.S. Cl.
CPC ........... *B23K 20/1215* (2013.01); *B23K 20/122* (2013.01); *B23K 20/129* (2013.01); *B23K 20/1225* (2013.01)

(58) Field of Classification Search
CPC .. B23K 20/122; B23K 20/1295; B23K 20/12; B23K 20/1225; B23K 20/1229

USPC ................................ 228/112.1, 113, 114, 2.1
See application file for complete search history.

(56) References Cited

U.S. PATENT DOCUMENTS

| 4,091,841 A | 5/1978 | Beneker et al. |
| 4,109,691 A | 8/1978 | Wilson |
| 5,078,294 A | 1/1992 | Staubli |
| 5,263,058 A | 11/1993 | Formanek |

(Continued)

FOREIGN PATENT DOCUMENTS

| CN | 201694495 U | 1/2011 |
| DE | 102010026667 A1 | 3/2011 |

(Continued)

OTHER PUBLICATIONS

"U.S. Appl. No. 14/043,596, Final Office Action mailed Jul. 30, 2014", 11 pgs.

(Continued)

*Primary Examiner* — Erin Saad
(74) *Attorney, Agent, or Firm* — Kwan & Olynick LLP

(57) ABSTRACT

In one aspect of the disclosure, an article for filling an opening in an object includes a plug having a body, a first flange, and a second flange. The plug has a trailing end. The first flange is in contact with the body and extends away from the body. The second flange is in contact with the first flange and extends away from the first flange and the body. The second flange is configured to deform toward the body upon installation of the plug into the opening. This deformation of the second flange rotationally and translationally secures the plug in the opening and consolidates the plug in the opening.

19 Claims, 14 Drawing Sheets

(56) References Cited

U.S. PATENT DOCUMENTS

| | | | |
|---|---|---|---|
| 5,971,252 | A | 10/1999 | Rosen et al. |
| 5,975,406 | A | 11/1999 | Mahoney et al. |
| 6,206,268 | B1 | 3/2001 | Mahoney |
| 6,543,671 | B2 | 4/2003 | Hatten et al. |
| 6,988,651 | B2 | 1/2006 | Stevenson et al. |
| 9,056,370 | B1 | 6/2015 | Matlack et al. |
| 2005/0279810 | A1 | 12/2005 | Stol et al. |
| 2006/0163328 | A1 | 7/2006 | Subramanian et al. |
| 2007/0241164 | A1 | 10/2007 | Barnes et al. |
| 2009/0120940 | A1 | 5/2009 | Shah |
| 2012/0308332 | A1 | 12/2012 | Jackson |
| 2013/0239397 | A1 | 9/2013 | Hotte |
| 2013/0312859 | A1 | 11/2013 | Seiffert et al. |
| 2015/0231733 | A1 | 8/2015 | Matlack et al. |

FOREIGN PATENT DOCUMENTS

| | | |
|---|---|---|
| DE | 102011086791 A1 | 5/2013 |
| WO | 2012107059 A1 | 8/2012 |

OTHER PUBLICATIONS

"U.S. Appl. No. 14/043,596, Advisory Action mailed Oct. 15, 2014", 3 pgs.

"U.S. Appl. No. 14/043,596, Examiner Interview Summary mailed Feb. 13, 2015", 3 pgs.

"U.S. Appl. No. 14/043,596, Examiner Interview Summary mailed May 23, 2014", 3 pgs.

"U.S. Appl. No. 14/043,596, Examiner Interview Summary mailed Oct. 2, 2014", 3 pgs.

"U.S. Appl. No. 14/043,596, Non Final Office Action mailed Apr. 24, 2014", 17 pgs.

"U.S. Appl. No. 14/043,596, Non Final Office Action mailed Dec. 4, 2014", 11 pgs.

"U.S. Appl. No. 14/043,596, Notice of Allowance mailed Apr. 6, 2015", 7 pgs.

"U.S. Appl. No. 14/043,596, Restriction Requirement mailed Apr. 1, 2014", 6 pgs.

"U.S. Appl. No. 14/700,384, Non Final Office Action mailed Jul. 8, 2015", 11 pgs.

"U.S. Appl. No. 14/700,384, Notice of Allowance mailed Nov. 30, 2015", 7 pgs.

"Canadian Application Serial No. 2,858 645, Office Action mailed Jun. 5, 2015", 5 pgs.

"European Application Serial No. 14187294.5, European Search Report mailed Oct. 6, 2015", 5 pgs.

"European Application Serial No. 14187294.5, Extended European Search Report mailed Jan. 4, 2016", 11 pgs.

FRICTION STIR WELD PLUGS AND METHODS OF USING THEREOF

CROSS-REFERENCE TO RELATED APPLICATIONS

This application is a divisional of U.S. application Ser. No. 14/700,384, entitled "FRICTION STIR WELD PLUGS AND METHODS OF USING THEREOF," filed on Apr. 30, 2015, which is a divisional of U.S. application Ser. No. 14/043,596, entitled "FRICTION STIR WELD PLUGS AND METHODS OF USING THEREOF," filed on 1 Oct. 2013 and issued as U.S. Pat. No. 9,056,370 on Jun. 16, 2015. All of these patent applications and patent are incorporated herein by reference in its entirety for all purposes.

BACKGROUND

When parts are joined using friction stir welding, intersecting welds may often be performed. For each weld, an opening is formed at the location where the welding tool exits the parent material. Weld-exit openings are generally not desirable, particularly when a subsequent weld traverses the opening. Specifically, welding over an opening may cause voids in the weld nugget, thereby reducing the joint strength and creating surface imperfections due to the volumetric material deficiency in the weld. Various approaches for filling weld-exit openings have been proposed. For example, wedges having polygonal cross-sections may be staked into the openings using punches and hammers. However, this process is time consuming and only marginally effective since the polygonal cross-sectional shape of the wedges produces voids upon installation of the wedges into the parent material. Furthermore, the staked wedges may be ejected from the openings during the subsequent weld. Alternatively, reaming out the openings and press-fitting cylindrical members therein unfavorably increases the manufacturing cycle time.

SUMMARY

Accordingly, articles for and methods of filling openings in objects, intended to address the above-identified concerns, would find utility.

One example of the present disclosure relates to an article for filling an opening in an object. The article includes a plug having a body, a first flange, and a second flange. The first flange is in contact with the body and extends away from the body. The second flange is in contact with the first flange and extends away from the first flange and the body. The second flange is configured to deform toward the body upon installation of the plug into the opening. This deformation of the second flange rotationally and translationally secures the plug in the opening and consolidates the plug in the opening.

One example of the present disclosure relates to a method of friction stir welding an object. The method includes performing a first friction stir weld along a first weld path having an exit, with an opening formed in the object at the exit. The method also includes installing a plug into the opening. The plug is consolidated in the opening and is rotationally and translationally secured in the opening upon installation. The method also includes performing a second friction stir weld along a second weld path traversing the opening that contains the plug installed therein. The plug is at least partially consumed in the second friction stir weld.

One example of the present disclosure relates to a method of installing a plug into an opening in an object. The method includes providing a plug having a body, a first flange, and a second flange. The first flange is in contact with the body and extends away from the body. The second flange is in contact with the first flange and extends away from the first flange and the body. The method also includes installing the plug into the opening to consolidate the plug in the opening and to rotationally and translationally secure the plug in the opening.

BRIEF DESCRIPTION OF THE DRAWINGS

Figure 1:
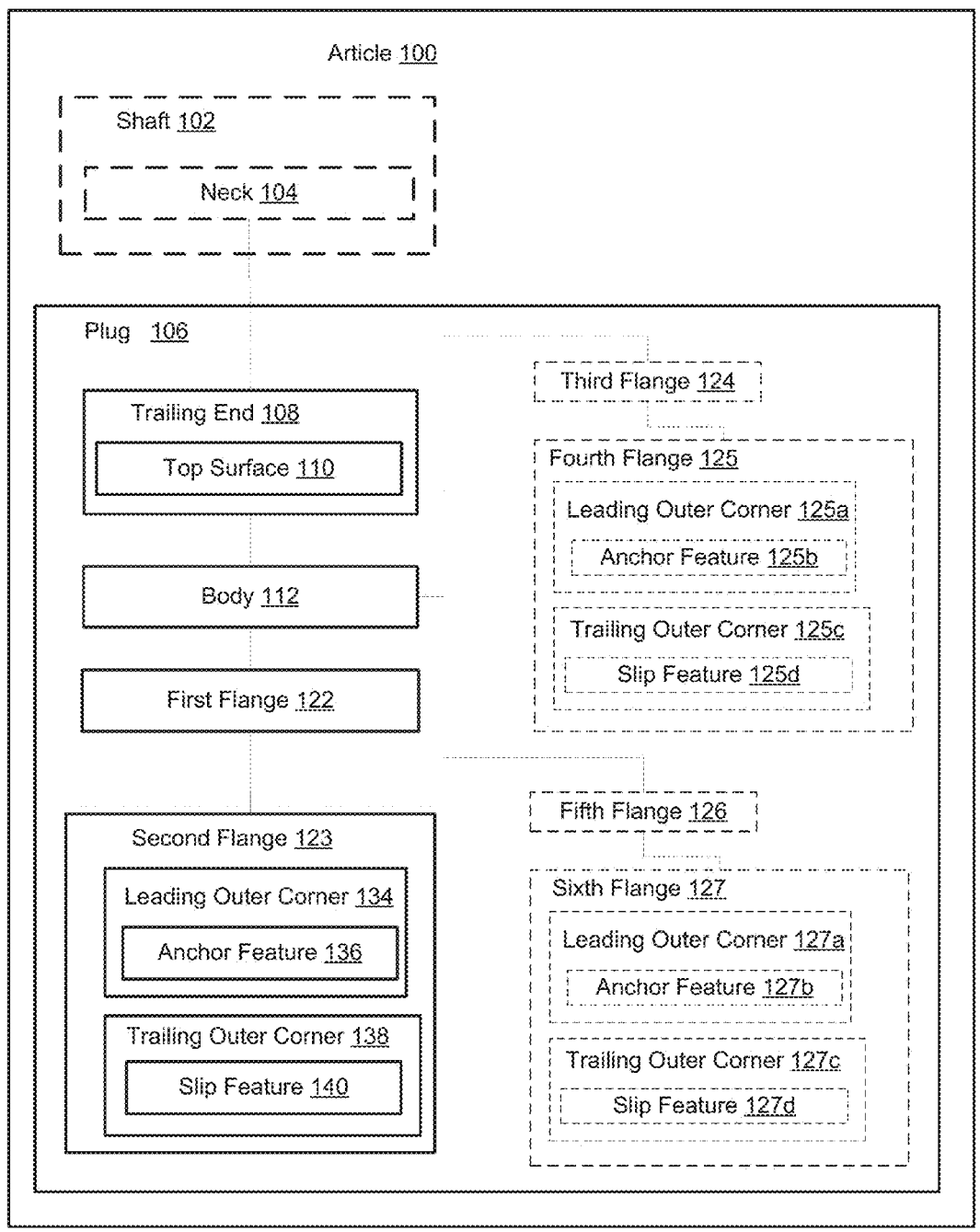
Figure 2A:
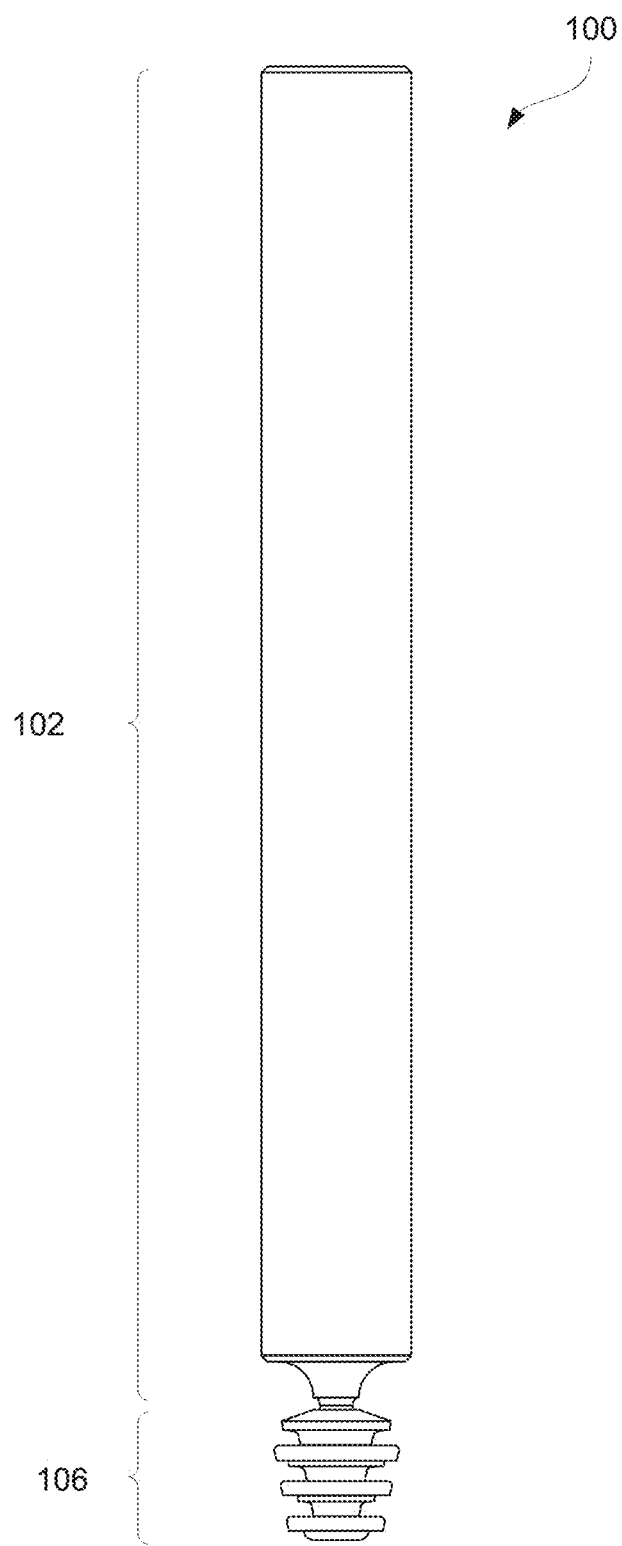
Figure 2B:
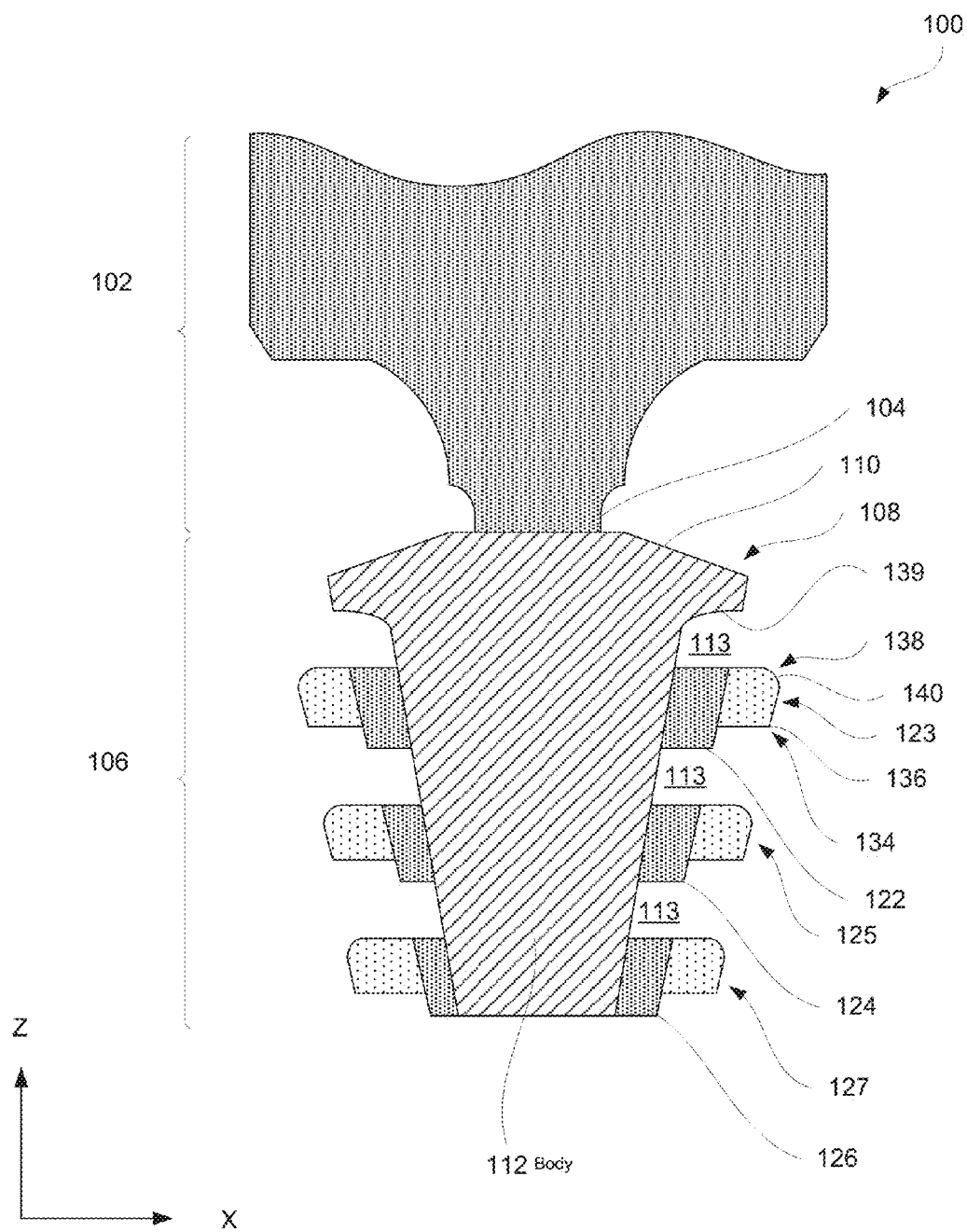
Figure 2C:
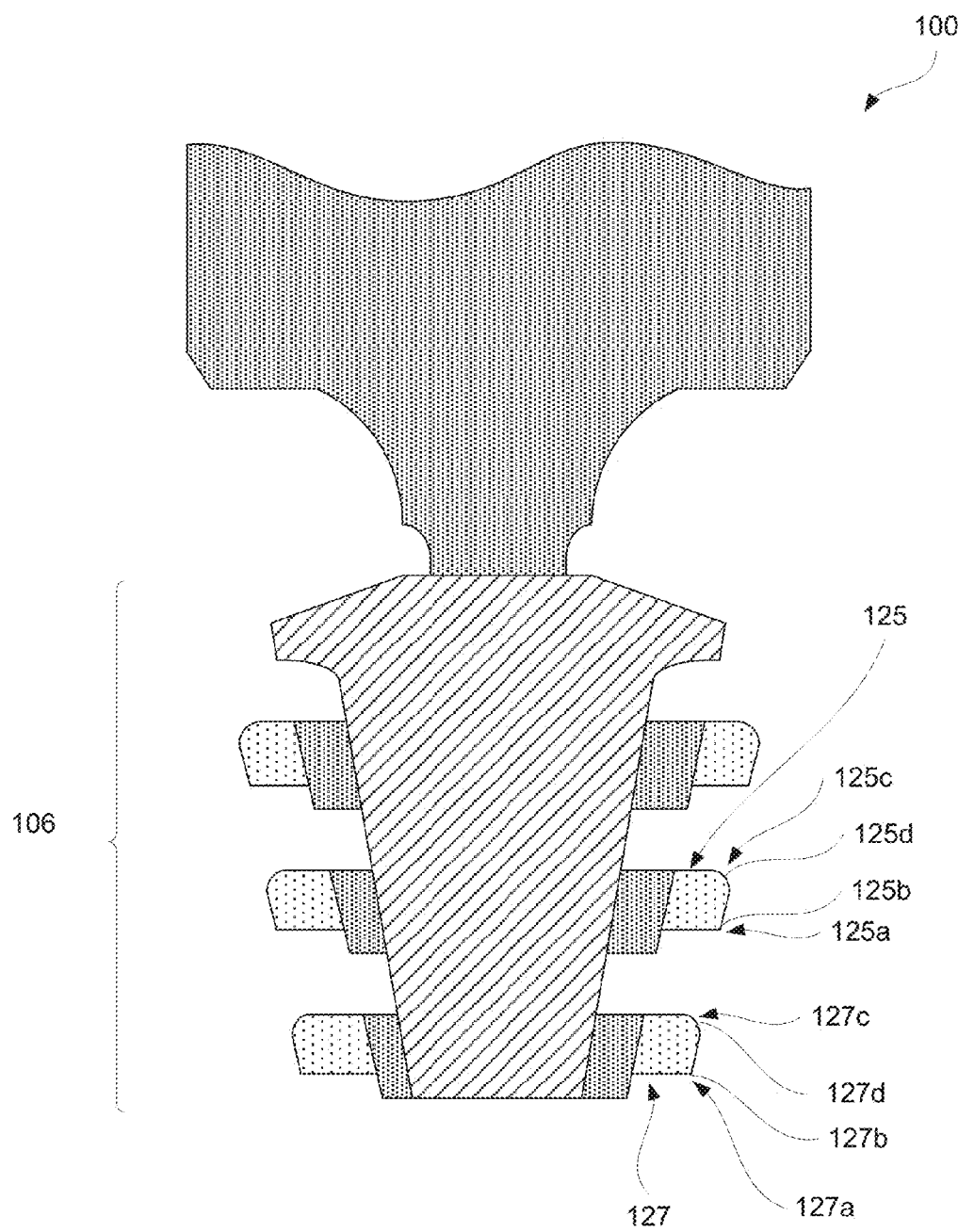
Figure 3:
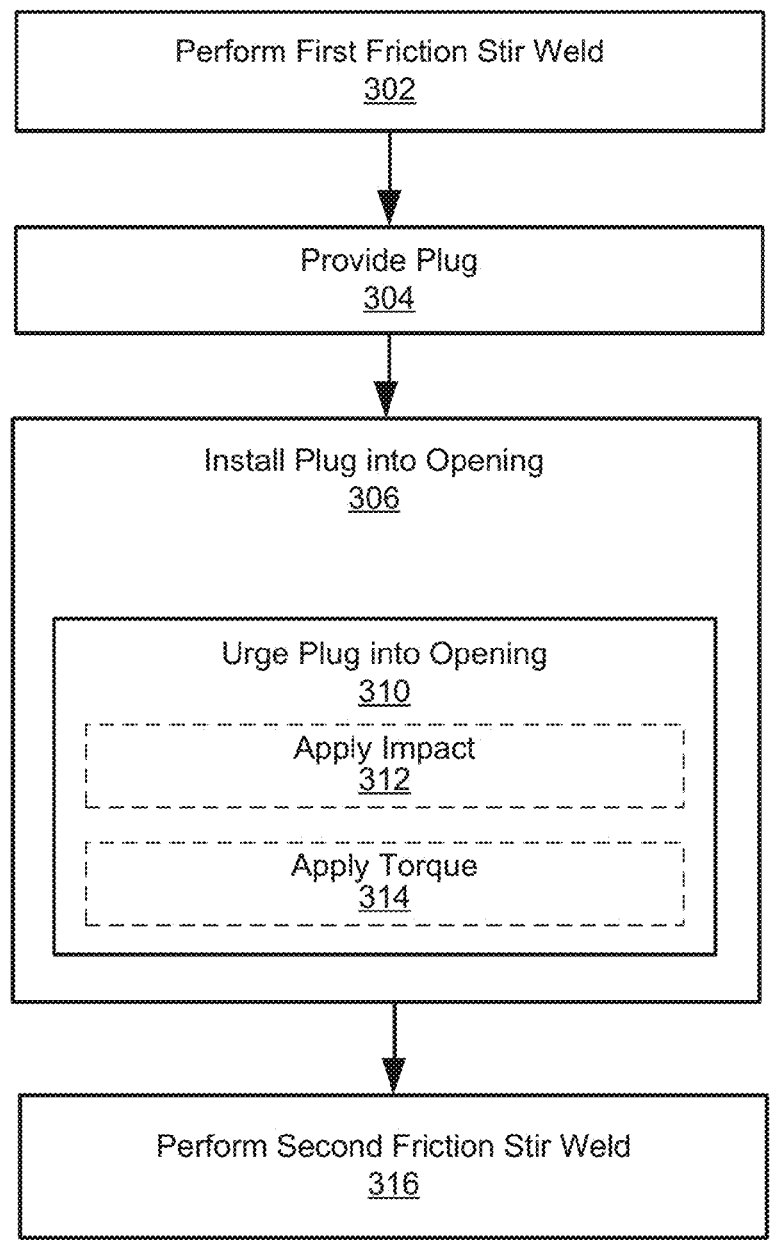
Figure 4A:
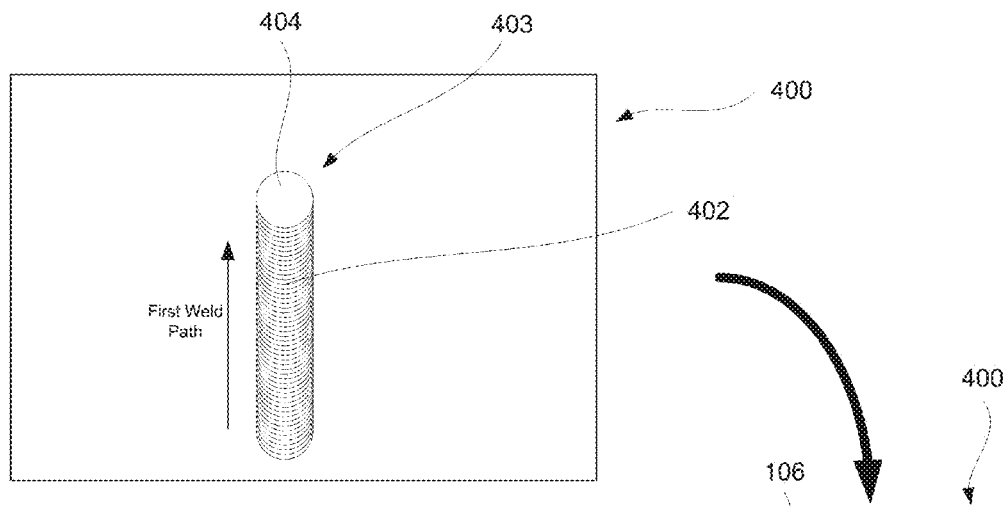
Figure 4B:
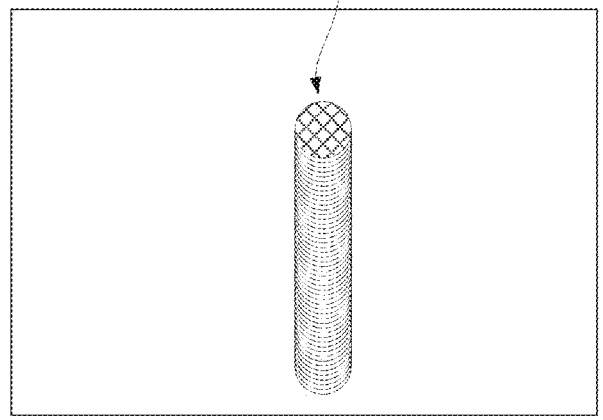
Figure 4C:
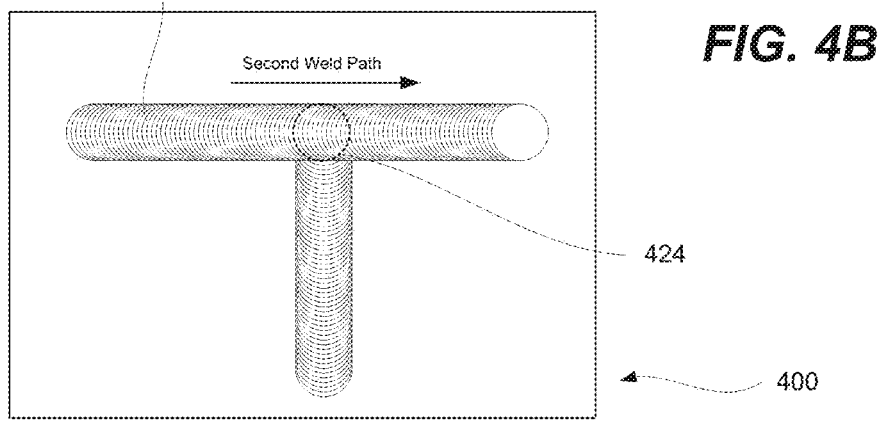
Figure 5A:
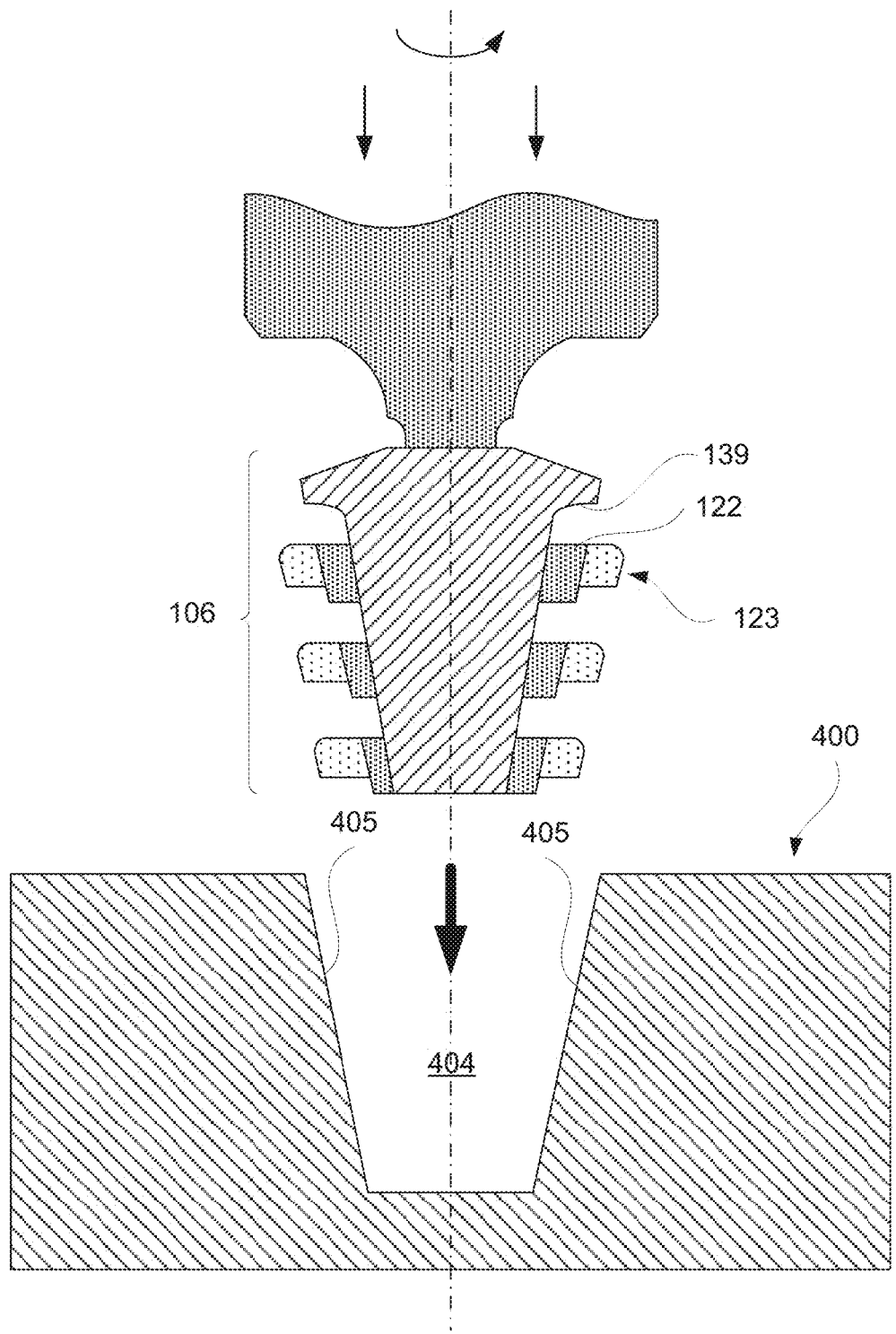
Figure 5B:
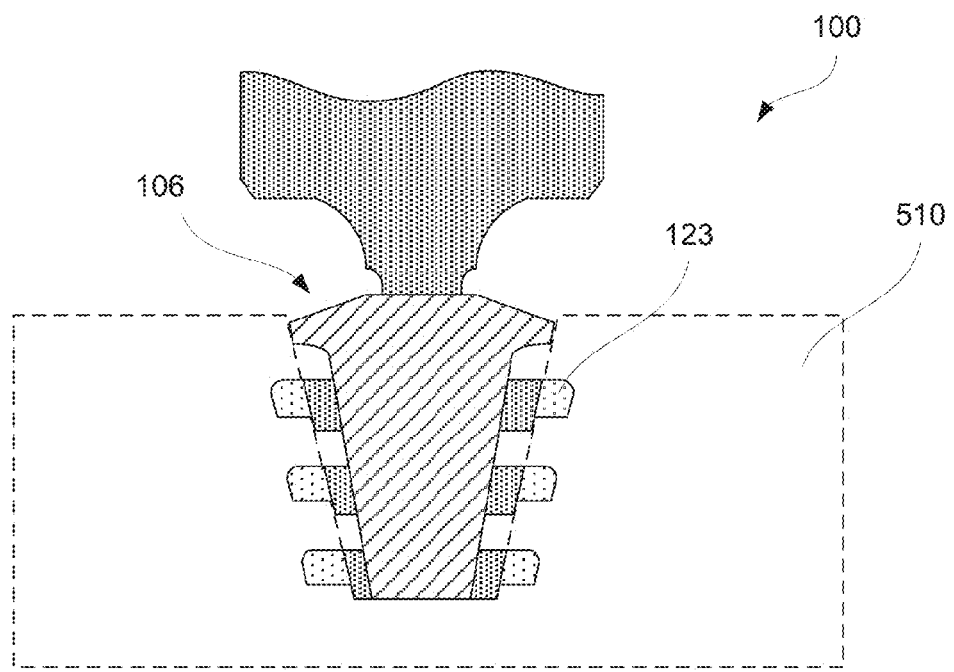
Figure 5C:
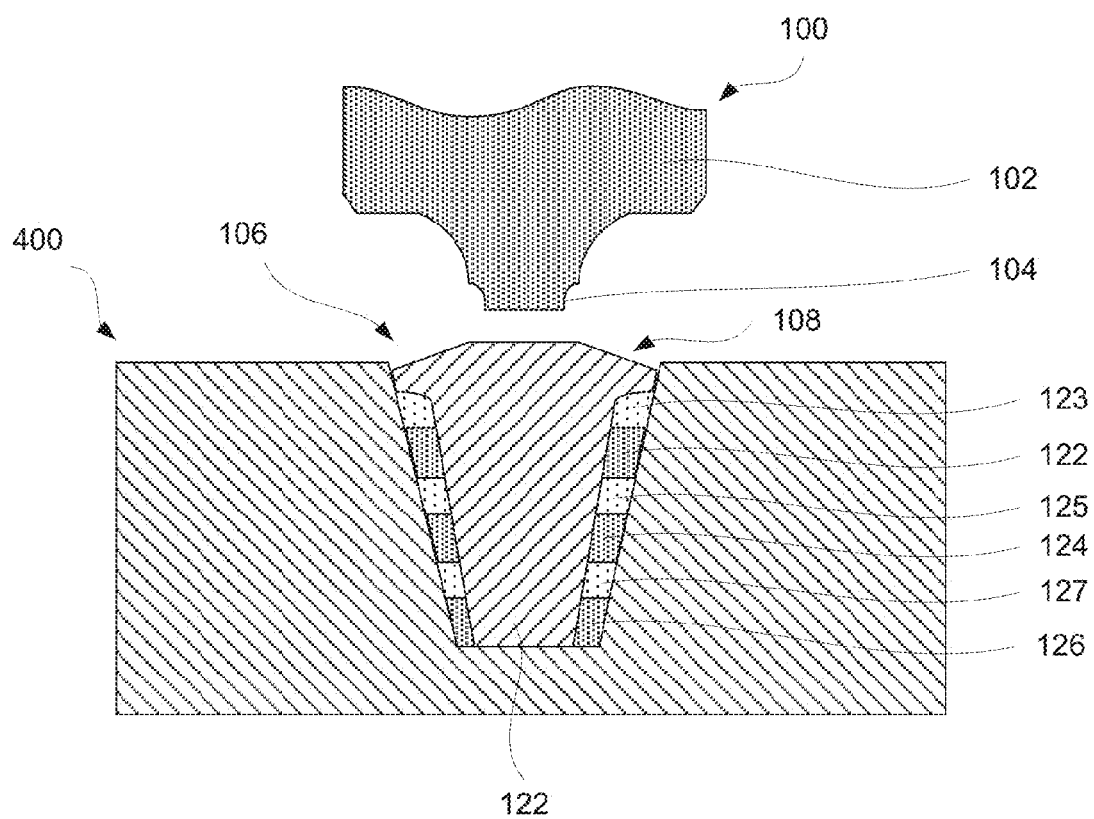
Figure 5D:
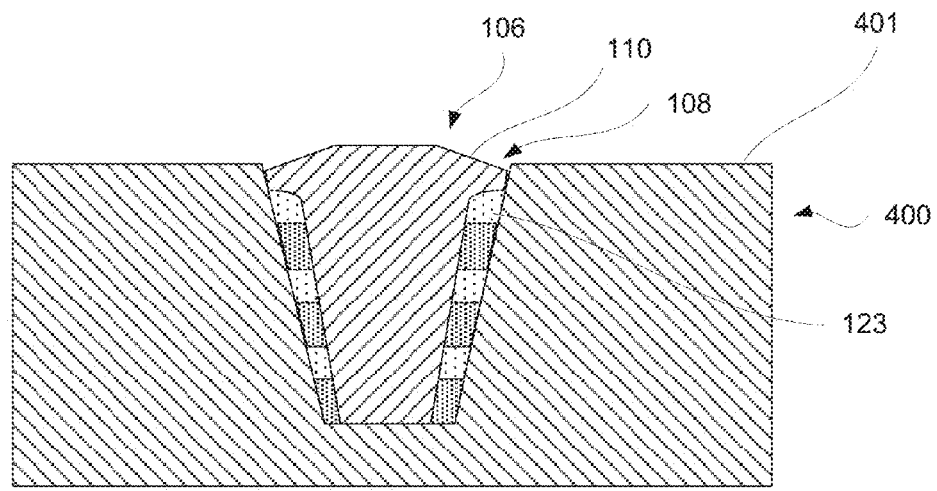
Figure 5E:
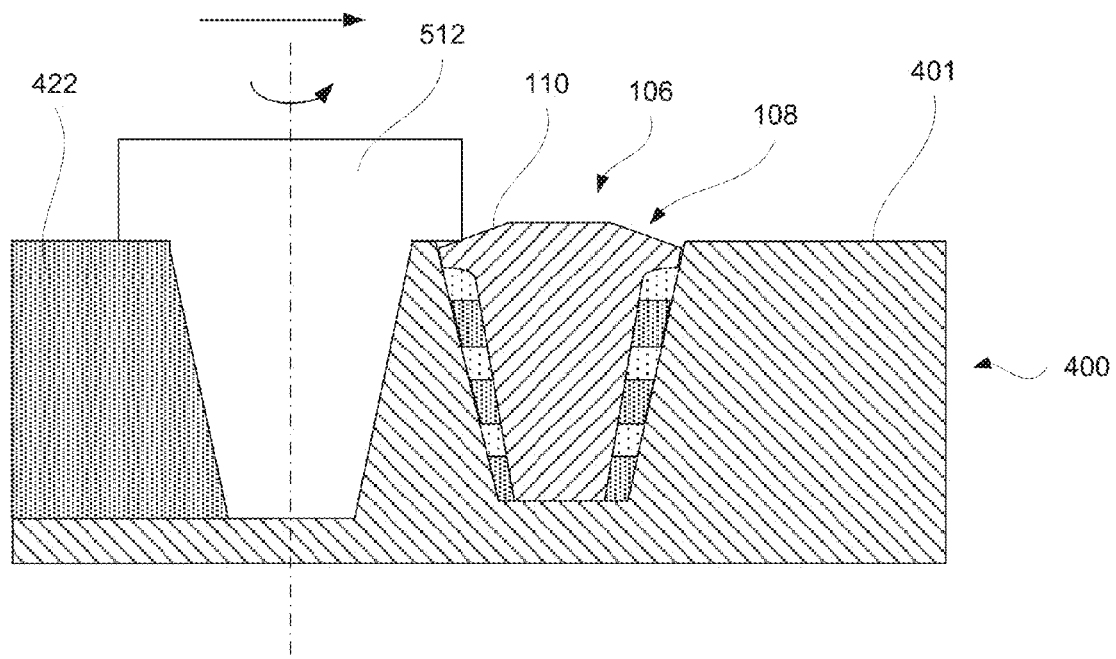
Figure 5F:
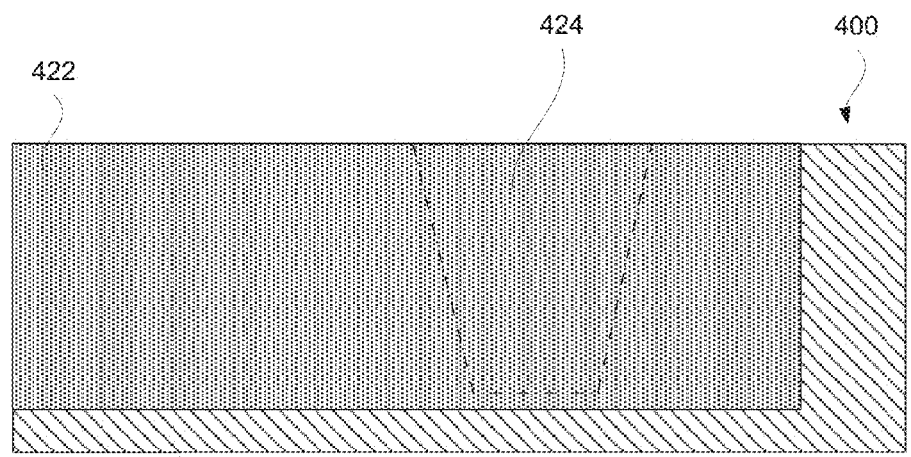
Figure 5G:
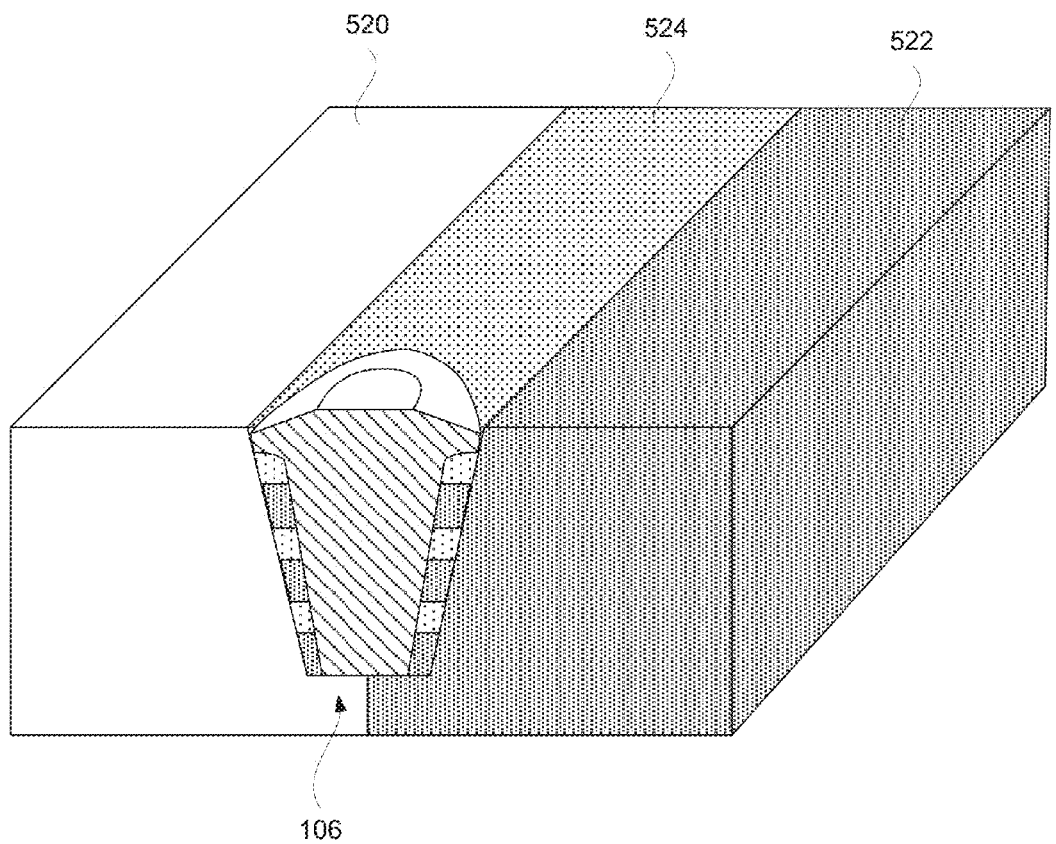
Figure 6:
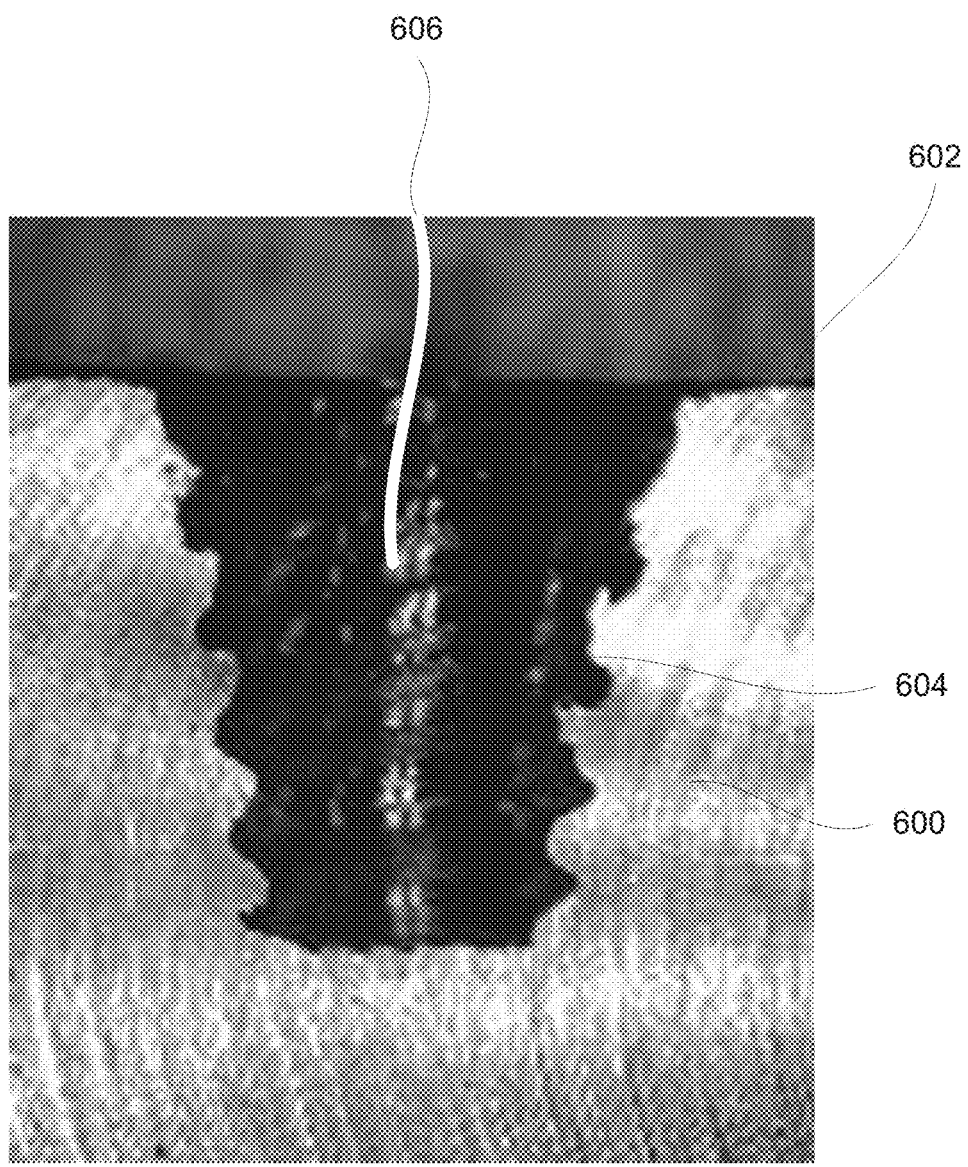
Figure 7A:
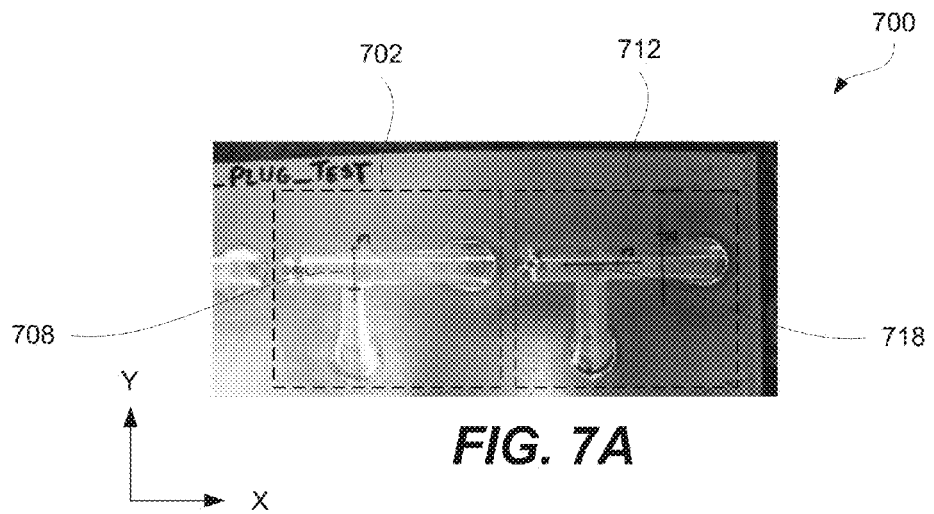
Figure 7B:
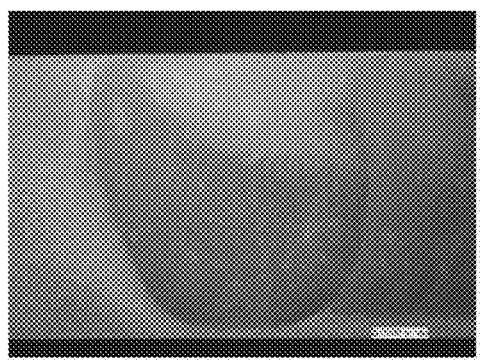
Figure 7C:
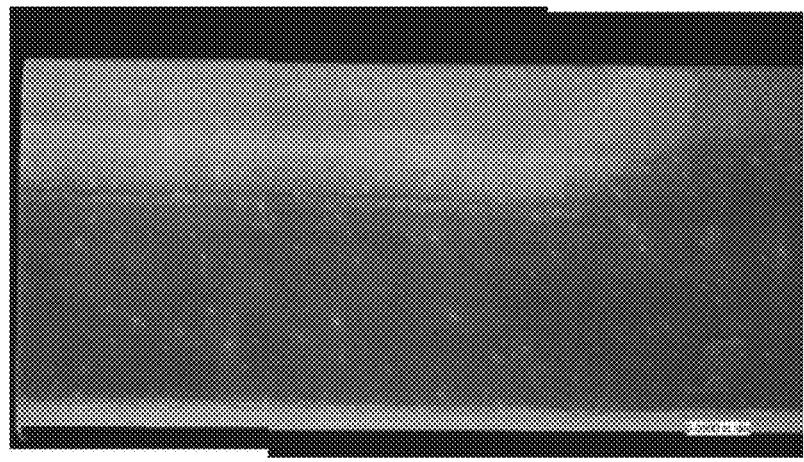
Figure 8:
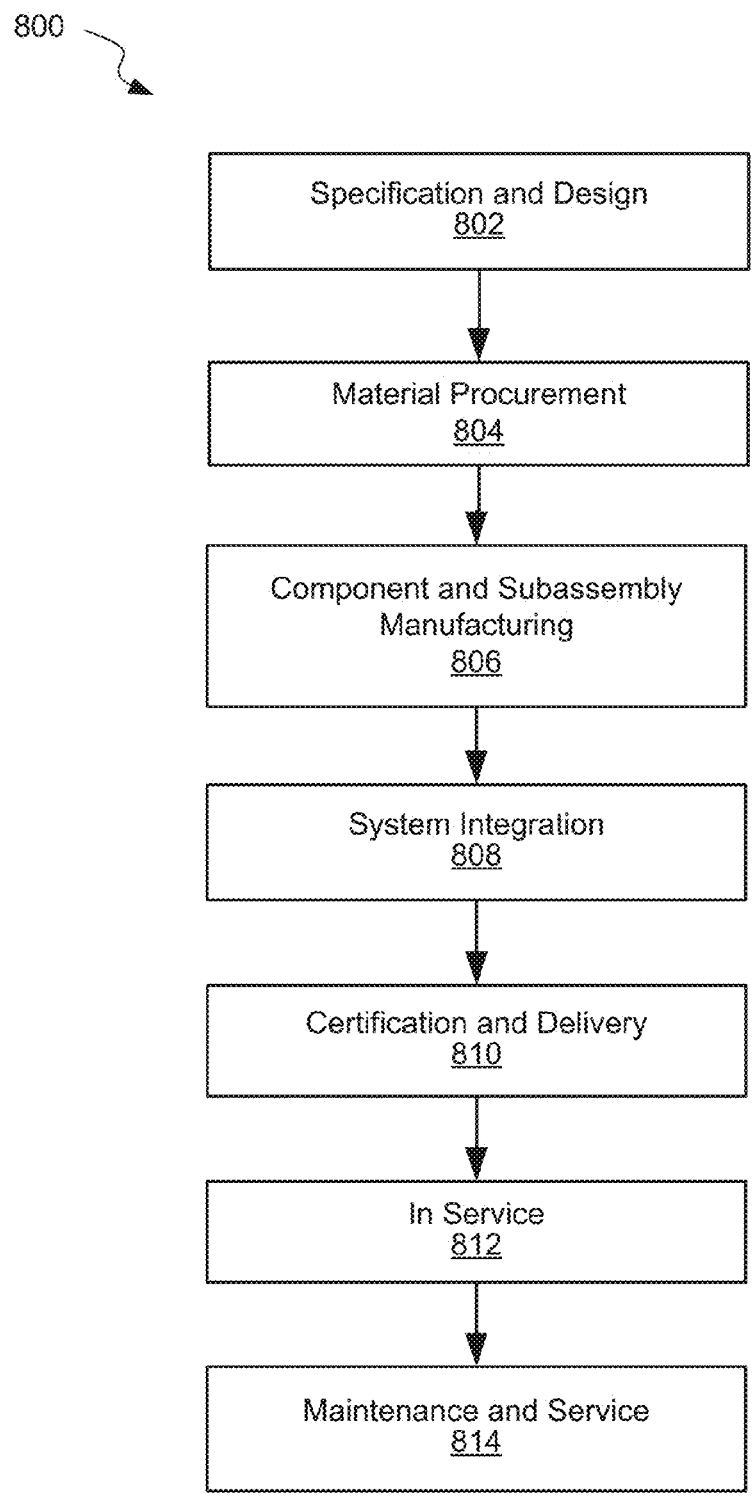
Figure 9:
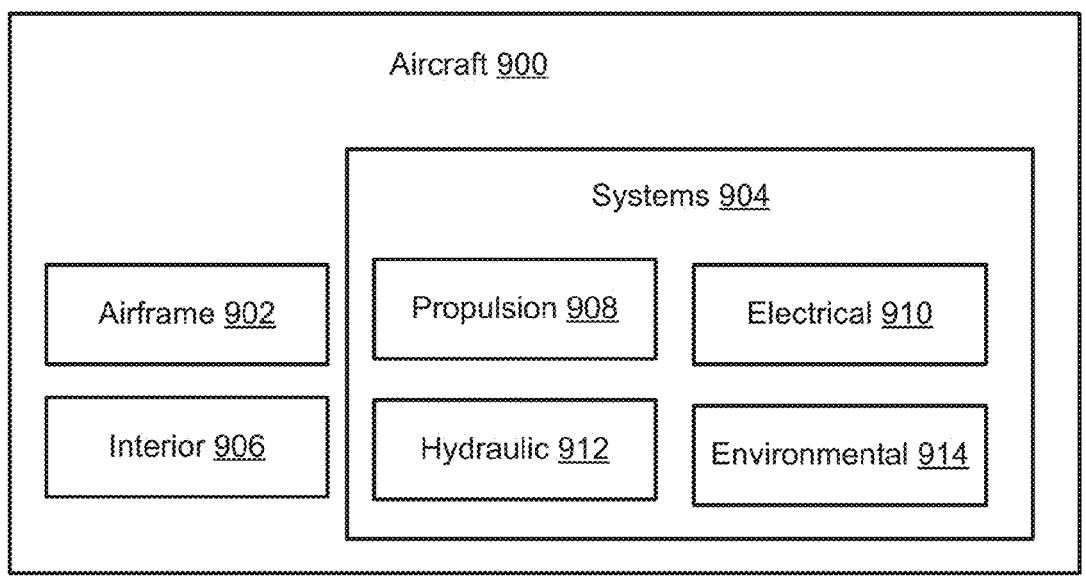

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of the article for filling an opening in an object;

FIG. 2A is a side view of the article of FIG. 1;

FIGS. 2B and 2C are sectional views of a portion of the article of FIG. 2A;

FIG. 3 is a process flow chart corresponding to a method of filling an opening in an object or of filling an opening in an object and friction stir welding the object;

FIG. 4A is a schematic top view illustrating an opening formed in an object by a first friction stir weld;

FIG. 4B is a schematic top view of the object shown in FIG. 4A, with the plug of FIG. 1 installed in the opening;

FIG. 4C is a schematic top view of the object shown in FIG. 4B after performing a second friction stir weld through the plug;

FIG. 5A is a sectional view of a portion of the article shown in FIG. 2A prior to installing a plug thereof into an opening in an object;

FIG. 5B is a sectional view of the plug shown in FIG. 5A, superimposed over a virtual contour of the object;

FIG. 5C is a sectional view of the article of FIG. 1, with the plug installed in the opening of FIG. 5A and the second flange of the plug deformed toward the body thereof;

FIG. 5D is a sectional view of the plug shown in FIG. 5C, installed in the opening, with the shaft decoupled from the plug;

FIG. 5E is a sectional view of the plug shown in FIG. 5D, installed in the opening, with the trailing end of the plug engaged by a friction stir welding tool;

FIG. 5F is a sectional view of the object shown in FIG. 5E, with the plug consumed in the second friction stir weld;

FIG. 5G is a sectional perspective view of the plug shown in FIG. 2A, installed in an opening formed when two objects are friction-stir-welded together;

FIG. 6 is a photograph of a section of an opening created by a friction-stir-welding tool;

FIG. 7A is a photograph of a top surface of an object having two sets of intersecting friction-stir welds, wherein each intersection includes a consumed plug;

FIGS. 7B and 7C are photographs of sections of the object of FIG. 7A illustrating the consumed plugs;

FIG. 8 is a flow diagram of aircraft production and service methodology;

FIG. 9 is a block diagram of an aircraft.

In the block diagram(s) referred to above, solid lines connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagram(s) may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with dashed lines, indicate alternative or optional aspects of the disclosure. Environmental elements, if any, are represented with dotted lines.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Referring, e.g., to FIGS. 1, 2A, 2B, and 5A, one example of the present disclosure relates to an article 100 for filling an opening 404 (FIG. 5A) in an object 400. The article 100 includes a plug 106 having a body 112, a first flange 122, and a second flange 123. As shown, e.g., in FIG. 2B, the first flange 122 is in contact with the body 112 and extends away from the body 112. The second flange 123 is in contact with the first flange 122 and extends away from the first flange 122 and the body 112. The second flange 123 is configured to deform toward the body 112 upon installation of the plug 106 into the opening 404. This deformation of the second flange 123 rotationally and translationally secures the plug 106 in the opening 404 and consolidates the plug 106 in the opening 404. The deformation of the second flange 123 is discussed below, e.g., with reference to FIGS. 5A-5C. In some examples, the first flange 122 may remain generally intact during deformation of the second flange 123. The first flange 122 and the body 112 may delimit at least a portion of a gap 113 for receiving the second flange 123 during the deformation thereof.

Referring, e.g., to FIG. 2A, in one aspect of the disclosure, which may include at least a portion of the subject matter of any of the preceding and/or following examples and aspects, the article 100 also includes a shaft 102 frangibly coupled to the plug 106. The shaft 102 is decoupled from the plug 106 during installation of the plug 106 into the opening 404, as further described below with reference to FIGS. 5C and 5D. For example, the shaft 102 may include a narrow neck 104 connecting the shaft 102 to the plug 106.

Referring to FIG. 2B, in one aspect of the present disclosure, which may include at least a portion of the subject matter of any of the preceding and/or following examples and aspects, the plug 106 includes a trailing end 108. A portion of the trailing end 108 is configured to protrude above a surface 401 (FIG. 5D) of the object 400 when the plug 106 is installed into the opening 404 (FIG. 5A). Specifically, FIG. 5D illustrates the plug 106 installed in the opening 404 with a portion of the trailing end 108 or, more specifically, a portion of the trailing surface 110 extending above the surface 401 of the object 400.

Referring once again to FIG. 2B, in one aspect of the disclosure, which may include at least a portion of the subject matter of any of the preceding and/or following examples and aspects, the article 100 may also include a third flange 124 and a fourth flange 125. The third flange 124 is in contact with the body 112 and extends away from the body 112. The fourth flange 125 is in contact with the third flange 124 and extends away from the third flange 124 and the body 112. The fourth flange 125 is configured to deform toward the body 112 and toward the first flange 122 upon installation of the plug 106 into the opening 404 as, for example, shown in FIG. 5C. Similar to the deformation of the second flange 123, the deformation of the fourth flange 125 rotationally and translationally secures the plug 106 in the opening 404 and consolidates the plug 106 in the opening 404. The gap 113 between the first flange 122 and the third flange 124 may have the same size (e.g., volume) as the size (e.g., volume) of the fourth flange 125 to accommodate the deformation of the fourth flange 125 into the gap during the installation of the plug 106 into the opening 404. After the installation, the third flange 124 may remain generally intact, similar to the first flange 122.

The first flange 122 and the second flange 123 of the plug 106 form an arrangement of flanges. When additional arrangements of flanges are present, such as the third flange 124 and the fourth flange 125, described above, one flange in each of the arrangements may be received into the corresponding gap 113 in a manner similar to the second flange 123 and the fourth flange 125. The plug 106 may include, e.g., one, two, three, four, five arrangements of flanges, and so on. For example, FIG. 2B illustrates the plug 106 having three such arrangements disposed along the body 112. The first arrangement is formed by the first flange 122 and the second flange 123, the second arrangement is formed by the third flange 124 and the fourth flange 125, and the third arrangement is formed by the fifth flange 126 and the sixth flange 127. Adjacent flanges in contact with the body 112, e.g., the first flange 122 and the third flange 124, may delimit at least a portion of the gap 113 for receiving, e.g., the fourth flange 125 during the deformation thereof resulting from the installation of the plug 106 into the opening 404. Each additional arrangement of flanges further rotationally and translationally secures the plug 106 into the opening 404. Multiple arrangements of flanges may be distributed along the length of the plug 106, providing frictional interference with the object 400 at different locations. Furthermore, for a given length of the plug 106 (generally corresponding to the depth of the opening 404), increasing the number of arrangements of flanges allows using smaller flanges that may be easier to deform.

In one aspect of the disclosure, which may include at least a portion of the subject matter of any of the preceding and/or following examples and aspects, the body 112 may have a frusto-conical shape. Furthermore, the collective taper of the inner flanges, e.g., the first flange 122, the third flange 124, and any other flange in contact with the body 112, may be substantially the same as the taper of the opening. In one aspect of the disclosure, which may include at least a portion of the subject matter of any of the preceding and/or following examples and aspects, the fourth flange 125 has a smaller diameter than the second flange 123. It should be noted that the second flange 123 is disposed closer to the trailing end 108 of the plug 106 than the fourth flange 125. This type of the plug 106 may be used for tapered holes. Generally, a volume of each outer flange, e.g., the second flange 123, the fourth flange 125, and any other flange not directly in contact with the body 112, may correspond or, more specifically, may be substantially equal to the volume of a corresponding gap 113 configured to receive such flange. This volume correspondence allows achieve full consolidation of the plug 106 in the opening 404 once the plug is inserted into the opening. Furthermore, the difference between the outer and inner radii of each outer flange, which may be referred to as a length of the flange, may not exceed the height of the corresponding gap configured to receive such flange to ensure that the flange fits into the gap during consolidation of the plug 106 into the opening 404. For example, if the length of the outer flange is greater than the height of the gap, the outer flange may bridge the gap rather than fit inside the gap.

In one aspect of the disclosure, which may include at least a portion of the subject matter of any of the preceding and/or following examples and aspects, the body 112, the first flange 122, and the second flange 123 form a monolithic structure. For example, the body 112, the first flange 122, and the second flange 123 may be machined from a single piece of parent material.

In another aspect of the disclosure, which may include at least a portion of the subject matter of any of the preceding and/or following examples and aspects, the body 112, the first flange 122, and the second flange 123 may be fabricated as separate components and then assembled together. For example, the first flange 122 may be removably attached to the body 112, e.g., with a locational interference fit. The second flange 123 may be removably attached to the first flange 122 in a similar manner. In some aspects, the assembly of the plug 106 is performed to accommodate the installation of the plug 106 into the opening 404 of a given size, and the flanges are selected based on the size of the opening 404. In other words, the article 100 may be provided as a reconfigurable kit of multiple components. In one aspect, the article 100 may be supplied with multiple first flanges having different sizes and/or multiple second flanges having different sizes to accommodate openings of different size.

In one aspect of the disclosure, which may include at least a portion of the subject matter of any of the preceding and/or following examples and aspects, the body 112, the first flange 122, and the second flange 123 are made of the same material. For example, the body 112, the first flange 122, and the second flange 123 may be all made of aluminum, titanium, steel, bronze, copper, lead, plastic, or any other materials suitable for friction stir welding. In some aspects, the material used for the body 112, the first flange 122, and the second flange 123 is the same as the material of the object 400 containing the opening 404 for receiving the plug 106.

Alternatively, in one aspect of the disclosure, which may include at least a portion of the subject matter of any of the preceding and/or following examples and aspects, the second flange 123 may be made of a different material than the first flange 122. For example, the second flange 123 may be made from a material that is softer than the material of the first flange 122, thereby allowing the second flange 123 to deform while maintaining the structure of the first flange 122 substantially intact. Similarly, the body 112 may be made of a different material than the first flange 122 and/or the second flange 123.

Referring once again to FIG. 2B, in one aspect of the disclosure, which may include at least a portion of the subject matter of any of the preceding and/or following examples and aspects, the second flange 123 includes a slip feature 140 formed on a trailing outer corner 138 of the second flange 123. The slip feature promotes consolidation of the second flange 123 into the gap 113 during installation of the plug 106 into the opening 404 by reducing friction between the trailing outer corner 138 of second flange 123 and other surfaces, such as those of the plug 106. For example, during installation of the plug 106 into the opening 404, as illustrated in FIG. 5A, the trailing outer corner 138 may come in contact with a leading surface 139 of the trailing end 108 of the plug. In one aspect, the slip feature 140 may be implemented as a radius of the corner 138 and a chamfer on the corner 138.

In one aspect of the present disclosure, which may include at least a portion of the subject matter of any of the preceding and/or following examples and aspects, the second flange 123 includes an anchor feature 136 formed on a leading outer corner 134 of the second flange 123. The anchor feature 136 is configured to engage the surface of the inside wall of the opening 404 (FIG. 5A) during insertion of the plug 106 therein. Once engaged with the surface of the opening 404, the anchor feature 134 promotes deformation of the second flange 123 away from the direction of insertion of the plug 106 into the opening 404 and toward the body 112 of the plug into the gap 113. In one aspect, the anchor feature may be an apical edge formed by two intersecting surfaces of the second flange 123.

As shown, e.g., in FIGS. 1 and 2C, the fourth flange 125 may include a slip feature 125*d* formed on a trailing outer corner 125*c* of the fourth flange 125. The fourth flange 125 may also include an anchor feature 125*b* formed on a leading outer corner 125*a* of the fourth flange 125. Similarly, the sixth flange 127 may include a slip feature 127*d* formed on a trailing outer corner 127*c* of the sixth flange 127. The sixth flange 127 may also include an anchor feature 127*b* formed on a leading outer corner 127*a* of the sixth flange 127. Likewise, any other outer flange, such as the second flange 123, may include a slip feature formed on its trailing outer corner and/or an anchor feature formed on its leading outer corner.

In one aspect of the present disclosure, which may include at least a portion of the subject matter of any of the preceding and/or following examples and aspects flanges, such as the first flange 122 and the second flange 123, have an annular shape or a spiral shape. FIG. 2B illustrates the first flange 122 and the second flange 123 having annular shapes. Specifically, the first flange 122 and the second flange 123 are symmetric about a longitudinal axis of the opening 404 (FIG. 5A). The plug 106 having annular flanges may be installed into the opening 404 by urging (linearly advancing and/or rotating) the plug 106 into the opening 404 (FIG. 5A). The plug 106 having spiral flanges may be installed into the opening 404 by linearly advancing the plug 106 into the opening 404 and/or by rotating the plug 106 around the longitudinal axis of the opening 404. For example, the plug 106 may have spiral flanges that correspond to a helical thread in the exit hole of the weld.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Additionally, in some aspects of the disclosure, not all operations described herein need be performed.

As shown in FIG. 3, one example of the present disclosure relates to a method of installing the plug 106 into the opening 404 in the object 400 (FIG. 5A). The method of installing the plug 106 may be a part of the method of friction stir welding the object 400 described below or may be a standalone method that does not include one or both friction stir welding operations described below. The method of installing the plug 106 may include providing the plug 106 having the body 112, the first flange 122, and the second flange 123 (operation 304). As described above, the first flange 122 is in contact with the body 112 and extends away from the body 112. The second flange 123 is in contact with the first flange 122 and extends away from the first flange 122 and the body 112. The method includes installing the plug 106 into the opening 404 (operation 306) to consolidate the plug 106 in the opening 404 and rotationally and translationally secure the plug 106 in the opening 404. Installing the plug 106 into the opening 404 may include urging the plug 106 into the opening 404 thereby deforming the second flange 123 toward the body 112 (operation 310).

In one aspect of the disclosure, which may include at least a portion of the subject matter of any of the preceding and/or following examples and aspects, the second flange 123 includes the anchor feature 136 on the leading outer corner 134 of the second flange 123. As the plug 106 is urged into the opening 404, the anchor feature 136 grips a wall 405 of the opening 404, causing the second flange 123 to deform toward the body 112. Various aspects of the anchor feature 136 are described above.

In one aspect of the disclosure, which may include at least a portion of the subject matter of any of the preceding and/or following examples and aspects, the second flange 123 includes a slip feature 140 on the trailing outer corner 138 of the second flange 123. As the plug 106 is urged into the opening 404, the slip feature 140 allows the second flange 123 to deform toward the body 112 by reducing friction between the second flange 123 and other elements of the plug 106. Various aspects of the slip feature 140 are described above.

As discussed above, the consolidation of the plug 106 in the opening 404 may include deforming the second flange 123 toward the body 112. In some aspects, one or more additional outer flanges may be deformed during the operation 306. The plug 106 may substantially completely fill the opening 404 and, preferably, leaves substantially no voids in the opening 404 after installation of the plug 106 therein. A sectional view of the plug 106 installed into the opening 404 is shown in FIG. 5D. The opening 404 may be created, for example, during a friction stir welding operation, as is further described below with reference to FIGS. 4A-4C.

FIG. 5A illustrates the plug 106 and the object 400 prior to installing the plug 106 into the opening 404. Referring to FIG. 5B, it is apparent that the radial dimensions of one or more outer flanges, such as the second flange 123, exceed those of the corresponding portion(s) of the opening 404. Those skilled in the art will appreciate that FIG. 5B is a hypothetical sectional view of an overlap between the outer flanges (e.g., the second flange 123) of the plug 106 and an imaginary object profile 510.

Accordingly, insertion of the plug 106 into the opening 404 during operation 310 causes one or more outer flanges, e.g., the second flange 123, to deform, allowing the plug 106 to be fully inserted into the opening 404. As illustrated in FIG. 5C, the outer flange(s) are deformed into the available gap(s). For example, the second flange 123 may be consolidated into the gap between the first flange 122 and the trailing end 108. Similarly, the fourth flange 125 may be consolidated into the gap between the first flange 122 and the third flange 124. Additional outer flanges may be deformed into gaps formed between corresponding adjacent inner flanges. Some deformation of the object 400, the inner flanges (e.g., flanges 122, 124, and 126) and the body 112 may also occur during installation of the plug 106 into the opening 404.

Referring generally to FIG. 3, one example of the present disclosure relates to a method of friction stir welding the object 400 (FIG. 5E). The method includes performing a first friction stir weld 402 (FIG. 4A) along a first weld path having an exit 403 (operation 302). The first friction stir 402 weld causes the opening 404 to form in the object 400 at the exit 403 of the weld path. The method also includes installing the plug 106 (FIG. 4B) into the opening 404 (operation 306). The plug 106 is consolidated in the opening 404 and is rotationally and translationally secured in the opening 404 upon installation. The method also includes performing a second friction stir weld 422 (FIG. 4C) along a second weld path traversing the opening 404 that contains the plug 106 installed therein (operation 316). The installed plug 106 is at least partially consumed in the second friction stir weld 422.

Each of these operations will now be described in more detail. FIG. 4A is a top schematic view of the object 400 illustrating a first friction stir weld 402 and the opening 404. The opening 404 is formed at the terminus of the first friction stir weld 402 as the welding tool exits the object 400. A sectional view of the opening 404 is provided in FIG. 5A. In general, the opening 404 may vary in size and profile depending on the design of the weld tool and on the thickness and type of the weld. For example, the weld tool may have tapered threads causing roughness on the side walls of the opening 404. However, not all weld tools have this feature.

FIG. 4B is a top schematic view of the object 400 illustrating the plug 106 installed in the opening 404. A sectional view of the plug 106 installed into the opening 404 is depicted in FIG. 5D. Another view of the plug 106 installed into the opening 404 is shown in FIG. 5G. Specifically, FIG. 5G is a sectional perspective view of two objects 520 and 522, friction stir welded together and joined by a weld 524, with the plug 106 installed into the opening 404 created by the weld 524. The objects 520 and 522 may be made from the same or different materials. The weld 524 is formed by combining (intermixing) plasticized material from both objects 520 and 522.

FIG. 4C is a top schematic view of the object 400 showing an illustrative second friction stir weld 422, with the plug 106 (represented as element 424) at least partially consumed therein. FIG. 5F a sectional view of the friction stir weld 422 with the plug 106 (represented as element 424) at least partially consumed therein. Preferably, the plug 106 is substantially completely integrated into the weld 424.

In one aspect of the disclosure, which may include at least a portion of the subject matter of any of the preceding and/or following examples and aspects, installing the plug 106 into the opening 404 includes urging the plug 106 into the opening 404 during operation 310.

In one aspect of the disclosure, which may include at least a portion of the subject matter of any of the preceding and/or following examples and aspects, urging the plug 106 into the opening 404 includes applying an impact to the plug 106 (block 312 in FIG. 3) and/or applying a torque to the plug 106 (block 314 in FIG. 3). The impact may be applied to the shaft 102 frangibly coupled to the plug 106. This impact may decouple the shaft 102 from the plug 106, as shown, e.g., in FIG. 5C. Likewise, the torque applied to the plug may decouple the shaft 102 from the plug 106. FIG. 5D illustrates plug 106 without the shaft 102.

In one aspect of the disclosure, which may include at least a portion of the subject matter of any of the preceding and/or following examples and aspects, the plug 106 may be consolidated in the opening 404 by deforming the flange 123 of the plug 106 toward the body 112 of the plug 106. For example, the flange 123 may be deformed by urging the plug 106 into the opening 404 (operation 310). As discussed above, the plug 106 may include one or more outer flanges, such as the second flange 123.

In one aspect of the disclosure, which may include at least a portion of the subject matter of any of the preceding and/or following examples and aspects, the plug 106 is consolidated in the opening 404 substantially without voids. Deformation of one or more outer flanges toward the body of the plug 106 fills the gaps 113 between the inner flanges (FIG. 2B). As such, once the plug 106 is installed into the opening 404 in the object 400, there are substantially no voids between the plug 106 and the object 400.

In one aspect of the disclosure, which may include at least a portion of the subject matter of any of the preceding and/or following examples and aspects, the plug 106 comprises the trailing end 108. At least a portion of the trailing end 108 protrudes from the opening 404 above the surface 401 of the object 400 when the plug 106 is installed in the opening 404 as, shown, for example, in FIGS. 5D and 5E. The trailing end 108 is urged into the opening 404 by a friction stir welding tool 512 during the second friction stir weld 422, as shown, for example, in FIG. 5E, which is a sectional view of the installed plug 106 illustrating the trailing surface 110 of the trailing end 108 being engaged by the friction stir welding tool 512. Through this engagement, the plug 106 is urged into the opening 404, thereby promoting plasticizing of the plug and intermixing it with the parent material of the object 400. The tapered shape of the trailing surface 110 facilitates initial engagement of the trailing end 108 of the plug 106 by the friction stir welding tool 512. In some aspects, to ensure smooth initial engagement of the trailing end 108 of the plug by the friction stir welding tool, a portion of the trailing surface 110 may protrude below the surface 401 of the object 400.

Experimental Results

FIG. 6 is a photograph of a section of an opening 606 within an object 600 created by friction stir welding. For reference, the top surface of the object 600 is identified as an element 602, while the side walls defining the opening 606 are identified as an element 604. The opening 606 is shown to have a taper. The opening 606 also has spirally oriented ribs on the side walls 604, which may be created due to rotation of the welding tool while it is removed from the object 600.

FIG. 7A is a photograph of a top surface of an object 700 having two sets 702 and 712 of overlapping welds, wherein each of overlaps 708 and 718 includes a consumed plug. The overlap 708 was cross-sectioned in the Y direction, and the result is presented in FIG. 7B. The overlap 718 was cross-sectioned in the X direction, and the result is presented in FIG. 7C. FIGS. 7B and 7C illustrate complete filing of the overlaps 708 and 718 and lack of voids in these areas.

Aircraft-Related Examples

An aircraft manufacturing and service method 800 shown in FIG. 8 and an aircraft 900 shown in FIG. 9 will now be described to better illustrate various features of processes and systems presented herein. During pre-production, aircraft manufacturing and service method 800 may include specification and design 802 of the aircraft and material procurement 804. The production phase includes component and subassembly manufacturing 806 and system integration 808 of the aircraft. Thereafter, the aircraft may go through certification and delivery 810 in order to be placed in service 812. While in service by a customer, the aircraft is scheduled for routine maintenance and service 814 (which may also include modification, reconfiguration, refurbishment, and so on). While the examples described herein relate generally to servicing of commercial aircraft, they may be practiced at other stages of the aircraft manufacturing and service method 800.

Each of the processes of aircraft manufacturing and service method 800 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

As shown in FIG. 9, aircraft 900 produced by aircraft manufacturing and service method 800 may include airframe 902, interior 906, and multiple systems 904 and interior 906. Examples of systems 904 include one or more of propulsion system 908, electrical system 910, hydraulic system 912, and environmental system 914. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 800. For example, without limitation, components or subassemblies corresponding to component and subassembly manufacturing 806 may be fabricated or manufactured in a manner similar to components or subassemblies produced while the aircraft is in service.

Also, various features described herein may be utilized during aircraft component and subassembly manufacturing 806 and/or during system integration 808, which may expedite assembly of or reducing the cost of the aircraft. In some examples, these features may be utilized while the aircraft is in service, for example, during maintenance and service 814 of the aircraft.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Having the benefit of the teachings presented in the foregoing description and the associated drawings, many modifications of the disclosed subject matter will become apparent to one skilled in the art to which this disclosure pertains. Therefore, it is to be understood that the disclosure is not to be limited to the specific examples and aspects provided and that modifications thereof are intended to be within the scope of the appended claims. Moreover, although the foregoing disclosure and the associated drawings describe certain illustrative combinations of elements and/or functions, it should be appreciated that different combinations of elements and/or functions may be realized without departing from the scope of the appended claims.

What is claimed is:

1. A method of installing a plug into an opening in an object, the method comprising:
   providing a plug comprising a body, a first flange, a second flange, and a gap, wherein:
      the first flange is in contact with the body and extends away from the body,
      the second flange is in contact with the first flange and extends away from the first flange and the body,
      the first flange is disposed between the second flange and the body and separates the second flange and the body, and
      the first flange and the body delimit at least a portion of the gap; and
   installing the plug into the opening to consolidate the plug in the opening and to rotationally and translationally secure the plug in the opening, wherein the second flange shears from the first flange and consolidates into the gap toward the body and contacts the body upon installation.

2. The method of claim 1, wherein, upon installation, the second flange fills the gap substantially without voids.

3. The method of claim 1, wherein a volume of the gap is substantially equal to a volume of the second flange.

4. The method of claim 1, wherein installing the plug into the opening comprises urging the plug into the opening.

5. The method of claim 4, wherein:
the second flange comprises an anchor feature on a leading outer corner of the second flange, and
as the plug is urged into the opening, the anchor feature grips a wall of the opening, causing the second flange to deform toward the body.

6. The method of claim 4, wherein:
the second flange comprises a slip feature on a trailing outer corner of the second flange, and
as the plug is urged into the opening, the slip feature allows the second flange to deform toward the body by reducing friction between the second flange and other elements of the plug.

7. The method of claim 4, wherein urging the plug into the opening comprises applying an impact to the plug.

8. The method of claim 7, wherein the impact is applied to a shaft frangibly coupled to the plug, and wherein the impact decouples the shaft from the plug.

9. The method of claim 4, wherein urging the plug into the opening comprises applying a torque to the plug.

10. The method of claim 1, wherein the plug is consolidated in the opening by urging the plug into the opening to cause the second flange to deform toward the body of the plug.

11. The method of claim 1, wherein the body has a frusto-conical shape.

12. The method of claim 1, Wherein the plug comprises a trailing end, at least a portion of the trailing end protruding from the opening above a surface of the object when the plug is installed in the opening.

13. The method of claim 1, wherein the first flange remains intact while installing the plug into the opening.

14. The method of claim 1, wherein the gap and the second flange have a same size.

15. The method of claim 1, wherein the body, the first flange, and the second flange form a monolithic structure.

16. The method of claim 1, wherein the second flange is removably attached to the first flange.

17. The method of claim 1, wherein the first flange and the second flange are made from different materials.

18. The method of claim 1, wherein the first flange and the second flange are annular flanges.

19. The method of claim 1, wherein the first flange and the second flange are spiral flanges.

* * * * *